Dec. 16, 1941. B. WEMPE 2,266,349
METHOD OF PRODUCING HOLES IN THIN SHEETS OF METAL OR GLASS
Filed July 11, 1938
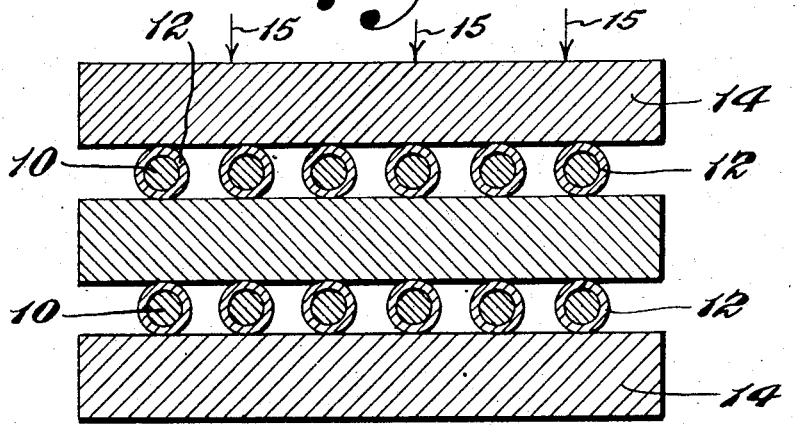
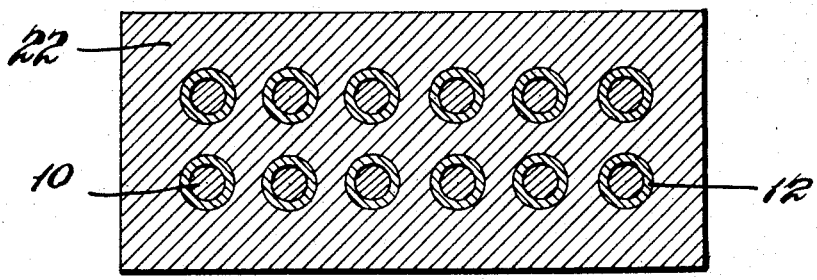
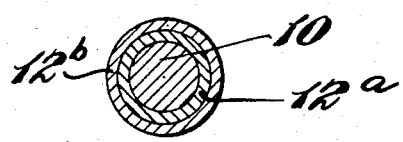
Inventor,
Bernhard Wempe
By: Glascock Downing & Seebold
Attorneys.

Patented Dec. 16, 1941

2,266,349

UNITED STATES PATENT OFFICE 2,266,349

METHOD OF PRODUCING HOLES IN THIN SHEETS OF METAL OR GLASS

Bernhard Wempe, Berlin, Germany

Application July 11, 1938, Serial No. 218,669
In Germany July 10, 1937

10 Claims. (Cl. 29—163.5)

(Granted under the provisions of sec. 14, act of March 2, 1927; 357 O. G. 5)

The present invention relates to a method of producing holes in thin sheets of metal or glass wherein the holes are of a very small diameter.

In my copending application Serial No. 125,892 filed February 15, 1937, a method of producing thin sheets of glass provided with uniform holes of small diameter has been claimed which comprises, forming a block by superposing a series of plates of glass with a layer of parallel wires of harder material between each two adjacent plates which on applying pressure and heat form grooves in the individual plates, so that, after a homogeneous block has been formed from the individual plates with the enclosed wires, sheets having a great number of parallel holes result after cutting the block and etching out the wires.

It has been found, that it is desirous to obtain walls of the holes as well as upper surfaces of the sheets as hard and resistant as possible and to render them stable chemically. For this purpose a hardening has already been proposed.

The various features and objects of the invention will be more fully understood and appreciated upon a consideration of the annexed drawing and the following description wherein several exemplary methods of carrying out the invention are disclosed.

In the drawing:

Fig. 1 is a sectional view of plates showing coated wires therebetween prior to the application of pressure and heat.

Fig. 2 is a sectional view of the homogeneous block showing the linings for the holes before the wires have been removed.

Fig. 3 is a transverse enlarged sectional view of a wire provided with a double coating.

Fig. 4 is a sectional view of a sheet formed by cutting the block transversely of the wires, showing the coatings on a face thereof.

According to the invention a layer resistant against chemical and mechanical actions is produced in the holes by using as insertions wires provided with a coating which, during the formation of the homogeneous block by the application of pressure and heat, combines with the material of the plates and is not solved on etching out the insertion wires.

In carrying out the invention a plurality of plates 14 of metal or glass are stacked as shown in Fig. 1. The plates 14 are preferably provided with smooth or polished faces. In superposing the plates 14 substantially parallel wires 10 of harder material than the plates are arranged between the adjacent plates as shown in Fig. 1. The wires 10 are, however, coated with a layer of metal 12 suitable for spinning nozzles before being arranged between the plates 14. The juxtaposed plates and the coated wires thus form a block as shown in Fig. 1.

The next step in the method includes the application of pressure to the block in the direction of the arrows 15 until the wires have been forced into the surfaces of the polished plates 14 and the coatings 12 are in contact with the plates throughout their surfaces. Heat is also applied to the block thereby converting the plates and the coatings of the wires by fusion into a homogeneous body 22 as shown in Fig. 2.

The homogeneous body is then cut transversely of the wires 10 into relatively thin sheets 16 as shown in Fig. 4. The short wires 10 may then be removed by etching to provide perforated sheets having openings 17 therein defined by linings formed of the coatings 12.

Preferably rhodium is used as a coating metal for the wires. Moreover, iridium, or hard precious metals or alloys of the same, for instance an alloy of platinum and rhodium, containing rhodium in a quantity of 10% for instance, come into consideration as a coating metal. Of course, all metals suitable for the manufacture of spinning nozzles may be used such as iridium, tantalum, niobium, zirconium, tungsten or platinum.

In order not to be compelled to use too large amounts of the high grade rhodium, the wire may be provided with a double coating, as shown in Fig. 3, by applying first a thin layer 12a of rhodium and then an additional layer 12b, for instance of tungsten, tantalum or another metal of this kind. The coating of the wire is effected in a well known manner either electrolytically or by thermal dissociation. Of course, the metal coating applied to the wire may be of any desired thickness. If thick coatings are used, material of the plates may be saved, as very thin plates may then be employed.

After hardening of the walls of the holes in this manner, the resistivity of the finished sheet is increased by providing the finished sheet 16 with a layer 18 of such hard precious metal. To be completely on the safe side a second coating 20 is preferably applied, and after applying the first coating the sheet is polished, whereupon the operation is repeated.

Example

Wires 10 of steel or better of molybdenum are in accordance with one of the well known methods coated with a layer of rhodium of 0.001 to 0.003 millimeter and inserted between plates 14 of metal or glass.

Then a homogeneous block 22 is formed in the manner indicated above and described in my above mentioned copending application by applying heat and pressure which block is cut into sheets 16 from which the wires 10 are removed in a manner also well known in the art.

Now the perforated plate is completely finished (polished) and then provided with a thin coating of rhodium. After again being subjected to a polishing operation a second coating of rhodium is applied to the plate, whereby all pores still present are filled, so that a perforated disc is obtained which by the coating is thoroughly protected against mechanical and chemical actions.

What I claim is:

1. A method of producing thin sheets provided with uniform holes of relatively small diameter which comprises, superposing polished fusible plates, coating wires of harder material than the plates with a layer of a metal suitable for resisting deterioration in spinning nozzles, arranging the coated wires in a substantially parallel manner between adjacent superposed plates, applying heat and pressure to the plates to force the coated wires into the surfaces of the polished plates, fusing the coatings of the wires to the plates, fusing the plates to each other to form a homogeneous body, cutting the homogeneous body at substantially right angles to the wires to form relatively thin sheets, and removing the wires only from the sheets whereby the coatings of the wires which are fused to the sheets provide linings for the holes.

2. A method as set forth in claim 1 in which the wires are coated with a layer of rhodium.

3. A method as set forth in claim 1 in which said wires are coated with a layer of iridium.

4. A method as set forth in claim 1 in which the wires are coated with a layer of tantalum.

5. A method of producing relatively thin sheets provided with holes as set forth in claim 1 in which said wires are coated with a plurality of layers of metal suitable for resisting deterioration in spinning nozzles.

6. A method of producing relatively thin sheets of metal provided with uniform holes of relatively small diameter and adapted for use in spinning nozzles which comprises, juxtaposing relatively thin polished plates of metal, coating wires formed of harder material than said plates with a layer of metal suitable for spinning nozzles, arranging said coated wires in a parallel manner between adjacent faces of said plates to form a block, applying heat and pressure to the block to force the coated wires into the surfaces of the polished plates, fusing the coatings of the wires to the plates and the plates to each other to form a homogeneous body, cutting the homogeneous body transversely of the wires to form relatively thin sheets, removing the wires only from said sheets, polishing the surfaces of the perforated sheets, and coating the surfaces of the sheets with a layer of hard precious metal.

7. A method of producing thin perforated sheets as claimed in claim 6 in which the perforated sheets are successively coated with two layers of hard precious metal.

8. A method of producing relatively thin perforated sheets as claimed in claim 1 in which said wires are coated with a layer of at least one metal selected from a group consisting of rhodium, iridium, tantalum, niobium, zirconium, tungsten and platinum.

9. A method of producing sheets provided with holes of relatively small diameter which comprises, coating wires with a layer of metal suitable for resisting deterioration in spinning nozzles, arranging the coated wires between fusible plates to form a composite block, applying heat and pressure to the block to force the coated wires into the surfaces of the plates, fusing the coatings of the wires to the plates to provide an intimate connection between the peripheries of the coatings and the plates, fusing the surfaces of the plates to each other to form a homogeneous body, cutting the body transversely of the wires into sheets, and removing the wires only whereby the coatings of the wires provide linings for the holes in the sheets.

10. The method of producing relatively thin sheets provided with holes of relatively small diameters which comprises, coating wires with a layer of rhodium, arranging the coated wires between fusible plates to form a composite block, applying heat and pressure to the block to force the peripheries of the coated wires into the surfaces of the plates, fusing the periphery of the coatings to the plates and fusing the surfaces of the plates to each other to form a unitary body, cutting the body transversely of the wires into sheets, and removing the wires only whereby the rhodium coating intimately united with the sheets forms linings for the holes in the sheets.

BERNHARD WEMPE.